United States Patent
Lamba et al.

(10) Patent No.: US 8,428,581 B2
(45) Date of Patent: Apr. 23, 2013

(54) METHOD AND APPARATUS FOR SUPPORTING LOCATION SERVICES FOR A ROAMING MOBILE STATION

(75) Inventors: Gaurav Lamba, Los Altos, CA (US);
Kirk A. Burroughs, Alamo, CA (US);
Bryan R. Cook, Oakland, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1343 days.

(21) Appl. No.: 12/142,482

(22) Filed: Jun. 19, 2008

(65) Prior Publication Data

US 2009/0036146 A1 Feb. 5, 2009

Related U.S. Application Data

(60) Provisional application No. 60/945,244, filed on Jun. 20, 2007.

(51) Int. Cl.
*H04W 4/00* (2009.01)
*H04W 24/00* (2009.01)

(52) U.S. Cl.
USPC ................. 455/432.1; 455/432.2; 455/432.3; 455/456.1; 455/456.2; 455/456.3

(58) Field of Classification Search .... 455/456.1–456.3, 455/435.1–435.3, 432.1–435.32
See application file for complete search history.

(56) References Cited

U.S. PATENT DOCUMENTS

2005/0255857 A1* 11/2005 Kim et al. .................. 455/456.1
2008/0096527 A1* 4/2008 Lamba et al. ................ 455/411
2011/0223909 A1* 9/2011 D'Souza et al. ........... 455/432.1

FOREIGN PATENT DOCUMENTS

WO WO9851104 A1 11/1998
WO WO9946948 A1 9/1999

OTHER PUBLICATIONS

"Control Plane Roaming" LBS Roaming San Francisco. Nov. 2006.*
Mobile IP. Perkins, C.E.;Communications Magazine, IEEE vol. 35, Issue 5, May 1997.*
International Search Report and Written Opinion, PCT/US08/067769—International Search Authority—European Patent Office, Oct. 9, 2008.
QUALCOMM: "Control Plane Roaming," [Online] Mar. 22, 2007, pp. 1-9, XP002495095.
Taiwan Search Report—TW097123265—TIPO—Aug. 16, 2011.
Burroughs, "Location Services Standards Update," QUALCOMM Inc., Dec. 2004, Kauai, USA, pp. 1-28.
Burroughs, "GHRC LBS Overview," Qualcomm Inc., Mar. 2005, pp. 1-22.
Burroughs, "LBS Control Plane Roaming," QUALCOMM Inc., Sep. 2006, LBS Roaming Summit, pp. 1-8.

* cited by examiner

*Primary Examiner* — Nathan Mitchell
(74) *Attorney, Agent, or Firm* — Thien T. Nguyen (57) ABSTRACT

Techniques to support location services for a roaming mobile station are described. The mobile station may communicate with a serving mobile switching center (MSC) in a serving network. A roaming service provider (RSP) network may map an actual MSC identity (MSCID) of the serving MSC to a generic MSCID and may provide the generic MSCID to a home network. A home mobile positioning center (H-MPC) may map the generic MSCID to an Internet Protocol (IP) address of a mapping server within the RSP network and may send a location request message containing a mobile station identity (MSID) to the mapping server. The mapping server may determine a serving mobile positioning center (S-MPC) based on the MSID and may forward the message to the S-MPC. The mapping server may also receive a location response message from the S-MPC and may forward the message to the H-MPC.

16 Claims, 8 Drawing Sheets

METHOD AND APPARATUS FOR SUPPORTING LOCATION SERVICES FOR A ROAMING MOBILE STATION

CLAIM OF PRIORITY UNDER 35 U.S.C. §119

The present application for patent claims priority to Provisional U.S. Application Ser. No. 60/945,244, entitled "Method, System and Apparatus for Roaming Service," filed Jun. 20, 2007, assigned to the assignee hereof, and expressly incorporated herein by reference.

BACKGROUND

I. Field

The present disclosure relates generally to communication, and more specifically to techniques for supporting location services for a roaming mobile station.

II. Background

It is often desirable, and sometimes necessary, to know the location of a mobile station, e.g., a cellular phone. The terms "location" and "position" are synonymous and are used interchangeably herein. For example, a user may utilize the mobile station to browse through a website and may click on location sensitive content. The location of the mobile station may then be determined and used to provide appropriate content to the user. There are many other scenarios in which knowledge of the location of the mobile station is useful or necessary.

The mobile station may be provisioned such that it can obtain location services (LCS) from a home network and also while roaming in a serving network. Location services may include any services based on or related to location information and may also be referred to as location-based services (LBS). An LCS client may request for the location of the mobile station while the mobile station is roaming in the serving network. The mobile station may then communicate with various network entities in the serving network in order to determine the location of the mobile station and to provide this location to the LCS client. A major challenge is then to support location services for the mobile station in such a roaming scenario.

SUMMARY

Techniques to support location services for a roaming mobile station are described herein. The mobile station may communicate with a serving mobile switching center (MSC) in a serving network, which may be different from a home network of the mobile station. An LCS client may send a request for the location of the mobile station to a home mobile positioning center (H-MPC) in the home network. Location services for the roaming mobile station may be supported in several manners.

In one design, a roaming service provider (RSP) network may receive an actual MSC identity (MSCID) of the serving MSC from the serving network, map the actual MSCID to a generic MSCID, and provide the generic MSCID to a home location register (HLR) in the home network. The RSP network may keep track of the roaming mobile station, and the home network may use the same generic MSCID for the mobile station regardless of its location. The H-MPC may obtain the generic MSCID from the HLR and may map this MSCID to an Internet Protocol (IP) address of a mapping server within the RSP network. The H-MPC may then send a location request message to the mapping server. This message may include a mobile station identity (MSID) of the mobile station.

The mapping server may receive the location request message from the H-MPC, extract the MSID from the message, and determine a serving mobile positioning center (S-MPC) for the mobile station. The mapping server may then forward the message to the S-MPC. The S-MPC, the serving MSC, and the mobile station may communicate to obtain a position estimate for the mobile station. The S-MPC may then send a location response message containing the position estimate to the mapping server, which may forward the message to the H-MPC.

In the above design, the H-MPC may receive the generic MSCID applicable for one communication protocol (i.e., ANSI-41) and may map this MSCID to an IP address applicable for another communication protocol (i.e., IP) based on a static mapping. The mapping server may provide mapping functions in order (i) to forward messages from the H-MPC to the S-MPC on the forward path and (ii) to forward messages from the S-MPC to the H-MPC on the return path. The mapping server may efficiently support location services for roaming in different networks.

In another design, the RSP network may provide the actual MSCID of the serving MSC to the HLR in the home network. The H-MPC may obtain the actual MSCID from the HLR and may map this MSCID to an IP address of the S-MPC. The H-MPC may then exchange messages for location services with the S-MPC using this IP address.

Various aspects and features of the disclosure are described in further detail below.

DETAILED DESCRIPTION

The techniques described herein may be used for various wireless networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as cdma2000, Wideband CDMA (WCDMA), etc. cdma2000 covers IS-2000, IS-856, and IS-95 standards. A TDMA network may implement a radio technology such as Global System for Mobile Communications (GSM), Digital Advanced Mobile Phone System (D-AMPS), etc. WCDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, certain aspects of the techniques are described below for 3GPP2 networks, and 3GPP2 terminology is used in much of the description below.

Figure 1:
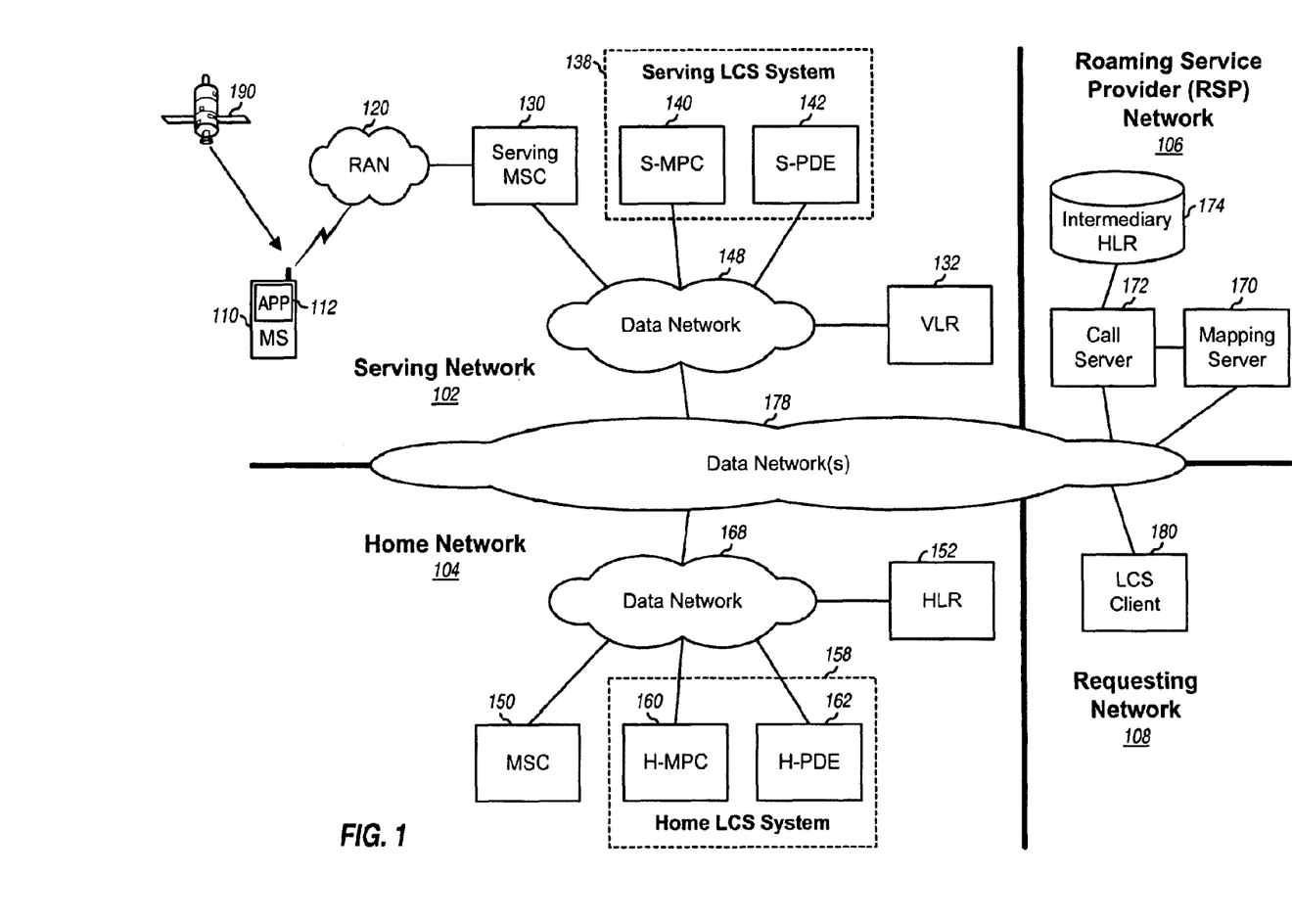
FIG. 1 shows a deployment with various networks.

FIG. 1 shows a deployment with a serving network 102, a home network 104, an RSP network 106, and a requesting network 108. The terms "serving" and "visited" are synonymous and are used interchangeably. Home network 104 is a wireless network with which a mobile station (MS) 110 has a service subscription. Serving network 102 is a wireless network currently serving mobile station 110. Serving network 102 and home network 104 may be different networks if mobile station 110 is roaming outside the coverage of the home network.

Mobile station 110 may be stationary or mobile and may also be referred to as a user equipment (UE), a terminal, an access terminal, a subscriber unit, a station, etc. Mobile station 110 may be a cellular phone, a personal digital assistant (PDA), a wireless device, a handset, a laptop computer, a telemetry device, a tracking device, etc. Mobile station 110 may communicate with a radio access network (RAN) 120 in serving network 102 to obtain communication services such as voice, video, packet data, broadcast, messaging, etc. Mobile station 110 may also receive signals from one or more satellites 190, which may be part of the United States Global Positioning System (GPS), the European Galileo system, the Russian GLONASS system, or some other satellite positioning system (SPS). Mobile station 110 may measure signals from satellites 190 and/or signals from base stations in RAN 120 and may obtain pseudo-range measurements for the satellites and/or timing measurements for the base stations. The pseudo-range measurements and/or timing measurements may be used to derive a position estimate for mobile station 110 using one or a combination of positioning methods such as assisted GPS (A-GPS), standalone GPS, Advanced Forward Link Trilateration (A-FLT), Enhanced Observed Time Difference (E-OTD), Observed Time Difference Of Arrival (OTDOA), Enhanced Cell ID, Cell ID, etc.

An application (APP) 112 may support location services for mobile station 110 and may comprise an LCS client and/or higher-layer applications. An LCS client is a function or an entity that requests location information for an LCS target. An LCS target is a mobile station whose location is being sought. In general, an LCS client may reside in a network entity or a mobile station or may be external to both.

In serving network 102, RAN 120 may support radio communication for mobile stations located within the coverage area of the RAN. RAN 120 may include base stations, base station controllers (BSCs), and/or other network entities that support radio communication. An MSC 130 may perform switching functions (e.g., routing of messages and data) for mobile stations within its coverage area, support circuit-switched calls, and route Short Message Service (SMS) messages.

A serving LCS system 138 may support location services for serving network 102. Location services may include positioning as well as other location-related services. Positioning refers to a process to measure/compute a geographic position estimate for a target device. A position estimate may also be referred to as a location estimate, a position fix, a fix, etc. Serving LCS system 138 may include an S-MPC 140 and a serving position determining entity (S-PDE) 142. S-MPC 140 may perform various functions for location services and may support subscriber privacy, authorization, authentication, roaming support, charging/billing, service management, position calculation, etc. S-PDE 142 may support positioning for mobile stations communicating with serving network 102 and may deliver assistance data to the mobile stations, calculate position estimates, perform functions for security, etc. A visitor location register (VLR) 132 may store registration information for mobile stations that have registered with serving network 102. The network entities in serving network 102 may communicate with one another via a data network 148.

In home network 104, an MSC 150 may support switching functions for mobile stations within its coverage area. A home LCS system 158 may support location services for home network 104 and may include an H-MPC 160 and a home position determining entity (H-PDE) 162, which may operate in similar manner as the corresponding network entities in serving LCS system 138. An HLR 152 may operate in similar manner as VLR 152 in serving network 102. The network entities in home network 104 may serve mobile stations communicating with the home network and may communicate with one another via a data network 168.

RSP network 106 may include a mapping server 170, a call server 172, and an intermediary HLR 174. Call server 172 may perform various functions to support roaming of mobile stations. For example, call server 172 may provide interoperability for Signaling System 7 (SS7) and ANSI-41 signaling exchanged between serving network 102 and home network 104. SS7 is a set of telephony signaling protocols often used to set up telephone calls via public switched telephone networks (PSTNs). ANSI-41 is a mobile networking protocol that allows for roaming and advanced services in 3GPP2 networks. GSM-MAP is a corresponding mobile networking protocol used in 3GPP networks. Call server 172 may also track roaming mobile stations so that home network 102 can simply query call server 172 to ascertain the current location of these mobile stations. Mapping server 170 may route messages between network entities in networks 102 and 104 in order to support location services for roaming mobile stations, as described below. Intermediary HLR 174 may store information indicative of the current location of the roaming mobile stations and may provide the information when requested.

Requesting network 108 may include an LCS client 180 that may desire to know the location of mobile station 110. LCS client 180 may communicate with H-MPC 160 to obtain the location of mobile station 110. Requesting network 108 may be part of serving network 102 or home network 104 or may be separate from these networks. For example, requesting network 108 may be a data network maintained by an Internet service provider (ISP). The entities in RSP network 106 and requesting network 108 may communicate with the entities in serving network 102 and home network 104 via data network(s) 178, which may include the Internet and/or other networks.

FIG. 1 shows an example of serving network 102, home network 104, and RSP network 106. These networks may include other network entities not shown in FIG. 1. In general, a network may include any combination of network entities that may support any services offered by the network.

Networks 102 and 104 may support a control plane location architecture for location services. A control plane (which is also called a signaling plane) is a mechanism for carrying signaling for higher-layer applications and is typically implemented with network-specific protocols, interfaces, and signaling messages. Messages supporting location services may be carried as part of signaling in a control plane architecture. 3GPP control plane is described in 3GPP TS 23.271, TS 43.059, and TS 25.305. 3GPP2 control plane is described in IS-881 and 3GPP2 X.S0002. These documents are publicly available.

In the description herein, the term "PDE" generically refers to an entity that supports positioning, the term "MPC" generically refers to an entity that supports location services, the term "mobile station" generically refers to an entity that may communicate with an MPC for location services and/or a PDE for positioning, the term "LCS client" generically refers to an entity that requests the location of a mobile station, and the term "mapping server" generically refers to an entity that performs mapping functions to support communication between MPCs. The PDE, MPC, mobile station, LCS client, and mapping server may also be referred to by other names, e.g., in other networks and other location architectures.

While mobile station 110 is in communication with serving network 102, a request for the location of the mobile station may be received, e.g., from an application resident on the mobile station, LCS client 180, or H-MPC 160. Even while roaming, it may be desirable to serve roaming mobile station 110 from home LCS system 158. This may allow home network 104 to retain control over security and authentication, user privacy, quality of position estimates, system scaling, billing, etc. Furthermore, this may allow mobile station 110 to obtain location services from home network 104 while roaming anywhere. To effectively serve mobile station 110 when roaming, H-MPC 160 in home network 104 may need to communicate with S-MPC 140 in serving network 102. This MPC-to-MPC communication may be supported in several manners.

Figure 2:
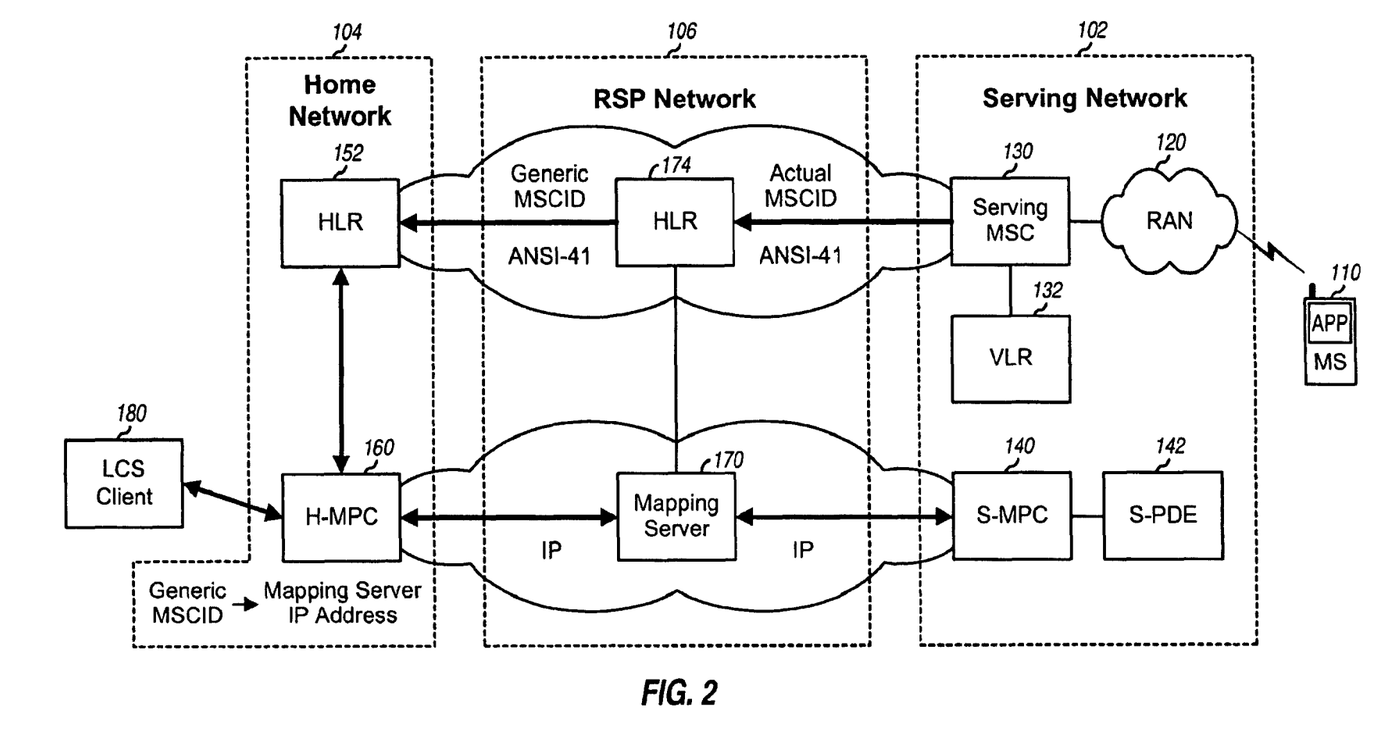
FIG. 2 shows a design to support location services for a roaming mobile station.

FIG. 2 shows a design to support location services for roaming mobile station 110 with a control plane architecture. Mobile station 110 may be roaming and may register with serving network 102. Within serving network 102, MSC 130 may communicate with VLR 132, which may store registration information for mobile station 110. Mobile station 110 may thereafter communicate with MSC 130 via RAN 120 in serving network 102.

During registration, serving network 102 may provide an actual MSCID of MSC 130 to RSP network 106. The actual MSCID may also be referred to as an MSC/VLR MSCID and may be considered as an ANSI-41 address that may be used to reach MSC 130. RSP network 106 may replace the actual MSCID with a generic MSCID, as is typically done. The generic MSCID may also be referred to as an RSP MSCID and is not usable directly to reach MSC 130.

RSP network 106 may provide the generic MSCID to home network 104. HLR 152 in home network 104 may store the generic MSCID as information indicative of the current location of mobile station 110. Intermediary HLR 174 in RSP network 106 may store a mapping of generic MSCID to actual MSCID. RSP network 106 may keep track of the current serving MSC for mobile station 110 and may update the generic MSCID to actual MSCID mapping, as needed, so that the current serving MSC for the mobile station can be ascertained. HLR 152 may use the generic MSCID as information indicative of the location of mobile station 110 and may not need to know the actual serving MSC for the mobile station, which may be tracked by RSP network 106.

While mobile station 110 is roaming in serving network 102, LCS client 180 may communicate with H-MPC 160 to request the location of mobile station 110. H-MPC 160 may communicate with HLR 152 to obtain the MSCID of the serving MSC for mobile station 110. HLR 152 may return the generic MSCID provided by RSP network 106 for mobile station 110. H-MPC 160 may have a static mapping of actual MSCIDs of different MSCs to IP addresses of MPCs designated to serve these MSCs. However, because the generic MSCID is not an actual MSCID, H-MPC 160 would not be able to obtain the IP address of an appropriate MPC for mobile station 110 based on this static mapping.

In an aspect, to support location services for roaming mobile station 110 in the control plane architecture, H-MPC 160 may map the generic MSCID to an IP address of mapping server 170 and may establish an IP connection with mapping server 170 using this IP address. H-MPC 160 may thereafter send messages for location services for mobile station 110 to mapping server 170, which may forward these messages to the appropriate S-MPC 140 for mobile station 110. Mapping server 170 may also receive messages for location services for mobile station 110 from S-MPC 140 and may forward these messages to H-MPC 160.

Each message for location services for mobile station 110 sent by H-MPC 160 to mapping server 170 may include an MSID of mobile station 110. This MSID may be an International Mobile Subscriber Identity (IMSI), a Mobile Subscriber ISDN Number (MSISDN), a Mobile Identification Number (MIN), an International Mobile Equipment Identity (IMEI), a public user SIP Uniform Resource Identifier (URI), or some other identity.

Mapping server 170 may receive messages containing the MSID of mobile station 110 from H-MPC 160. The MSID of mobile station 110 may be mapped to the IP address of S-MPC 140 in various manners. In one design, the MSID of mobile station 110 may first be mapped to the actual MSCID of the serving MSC for the mobile station, e.g., by HLR 174. The actual MSCID may then be mapped to the IP address of S-MPC 140, e.g., by mapping server 170. The MSID of mobile station 110 may also be mapped to the IP address of S-MPC 140 in other manners. In any case, mapping server 170 may forward the messages from H-MPC 160 to S-MPC 140 using the S-MPC IP address determined based on the MSID extracted from these messages.

Figure 3:
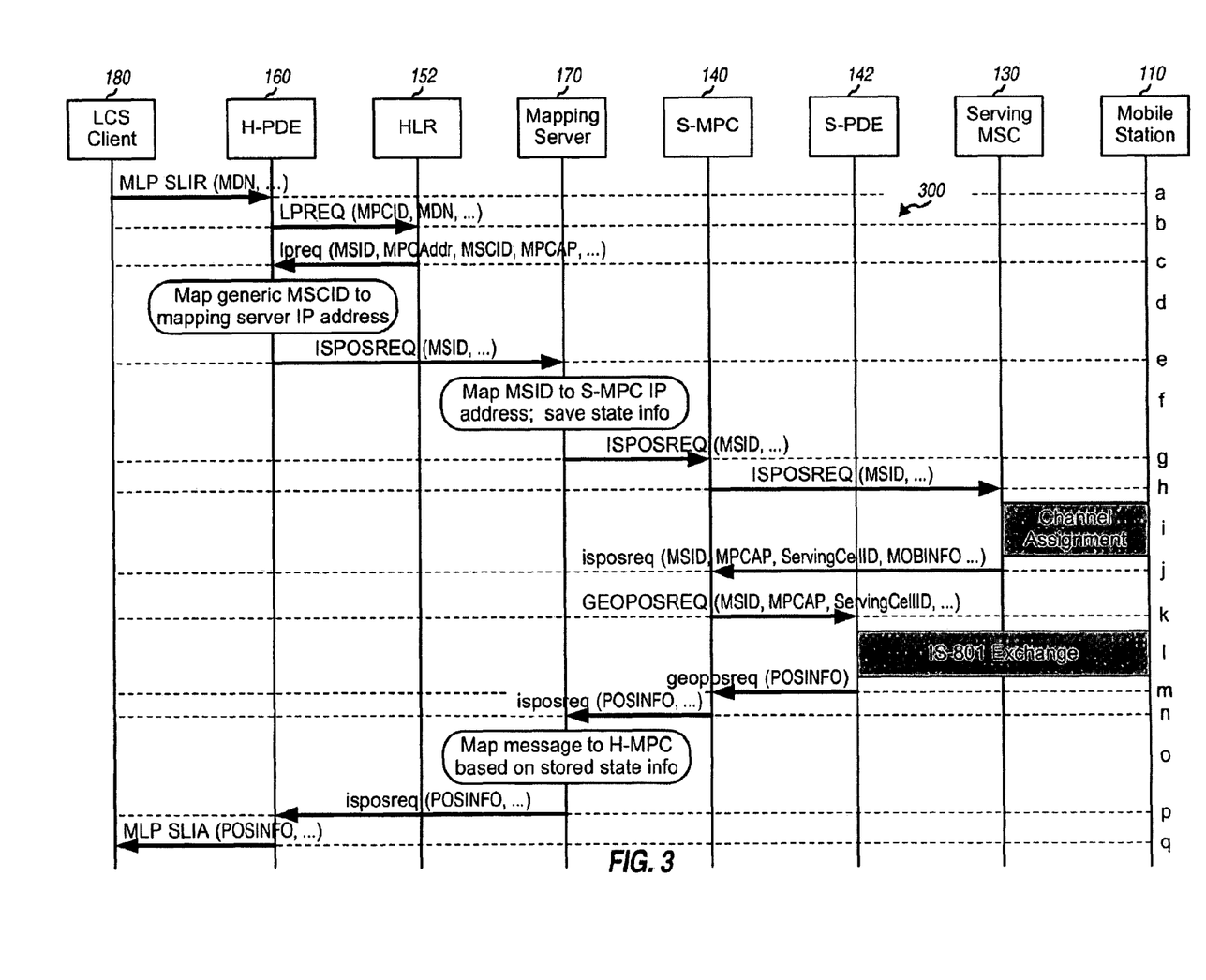
FIG. 3 shows a message flow for network-initiated location services.

FIG. 3 shows a design of a message flow 300 for network-initiated location services for the control plane architecture. LCS client 180 may send a Mobile Location Protocol (MLP) Standard Location Immediate Request (SLIR) message to H-MPC 160 to request the location of mobile station 110 (step a). The MLP LIR message may include a Mobile Directory Number (MDN) of mobile station 110 and possibly other information. H-MPC 160 may verify that LCS client 180 is authorized to obtain the location of mobile station 110. After successful authorization, if applicable, H-MPC 160 may send an LCS Parameter Request Invoke (LPREQ) message to HLR 152 to request the MSCID of the serving MSC in which mobile station 110 is registered (step b). The LPREQ message may include an MPC identity (MPCID) of H-MPC 160 and the MDN of mobile station 110.

HLR 152 may receive the LPREQ message from H-MPC 160 and may return an LCS Parameter Request Return Result (lpreq) message (step c). The lpreq message may include the MSID (e.g., IMSI or MIN), the generic MSCID for the serving MSC for mobile station 110, the positioning capabilities of mobile station 110 (MPCAP), etc. H-MPC 160 may map the generic MSCID to an IP address of mapping server 170, e.g., based on a static mapping at the H-MPC (step d).

H-MPC 160 may then send an Inter-System Position Request (ISPOSREQ) message to mapping server 170 using the IP address obtained in step d (step e). The ISPOSREQ message may request the location of mobile station 110 and may include the MSID, the desired positioning quality of service (PQOS), etc. Mapping server 170 may receive the ISPOSREQ message, extract the MSID from the message, and determine the IP address of an appropriate S-MPC, which in this example is S-MPC 140 (step f). Mapping server 170 may also save state information for this transaction. The state information may include the MSID, the H-MPC IP address, the S-MPC IP address, etc. Mapping server 170 may then forward the ISPOSREQ message to S-MPC 140 using the S-MPC IP address (step g).

S-MPC 140 may receive the ISPOSREQ message and may verify that this message has been received from an authorized entity. S-MPC 140 may determine that the current location of mobile station 110 needs to be ascertained in order to satisfy the location request. S-MPC 140 may then send an ISPOSREQ message containing the MSID and other information to MSC 130 (step h). If mobile station 110 is currently idle, then MSC 130, RAN 120, and mobile station 110 may exchange signaling to obtain paging and/or traffic channel assignment for the mobile station (step i). MSC 130 may then return to S-MPC 140 an isposreq message that may include the MSID, the positioning capabilities of mobile station 110, the serving cell ID, and other information needed to determine the location of mobile station 110 (MOBINFO) (step j).

S-MPC 140 may select S-PDE 142 to determine the mobile station location based on the positioning capabilities of mobile station 110, the PQOS, etc. S-MPC 140 may then send to S-PDE 142 a Geoposition Request (GPOSREQ) message that may include the MSID, the mobile station positioning capabilities, the serving cell ID, etc. (step k). S-PDE 142 and mobile station 110 may then engage in an IS-801 session, e.g., for satellite-based positioning (step l). For the IS-801 session, S-PDE 142 may provide assistance data to mobile station 110, exchange measurement information with mobile station 110, compute a position estimate for mobile station 110, etc.

S-PDE 142 may then return to S-MPC 140 a gposreq message that may include a position estimate for mobile station 110 (POSINFO) and possibly other information (step m). S-MPC 140 may then return to mapping server 170 an isposreq message that may include the POSINFO (step n). Mapping server 170 may identify H-MPC 160 as the recipient of the isposreq message based on the state information stored for the transaction in step f (step o). Mapping server 170 may then forward the isposreq message to H-MPC 160 (step p). H-MPC 160 may provide the position estimate for mobile station 110 in an MLP Standard Location Immediate Answer (SLIA) message sent to LCS client 180 (step q).

Some of the messages and parameters in message flow 300 are described in 3GPP2 X.S0002-0, entitled "TIA/EIA-41-D Location Services Enhancements," March 2004, which is publicly available.

As shown in FIG. 2, RSP network 106 may support roaming and may provide peering point for SS7/ANSI-41 signaling exchange between serving network 102 and home network 104. RSP network 106 may also support intermediary HLR function and may provide a generic MSCID to home network 104 for roaming mobile station 110. This generic MSCID may avoid the need for home network 104 to keep track of mobile station 110, which may be a value-added function provided by RSP network 106. However, this generic MSCID may also prevent home network 104 from determining an appropriate S-MPC based on a static mapping of actual MSCIDs to MPC IP addresses, as discussed above.

In the design shown in FIGS. 2 and 3, roaming for location services in the control plan architecture with generic MSCID may be supported via several innovative features. First, H-MPC 160 may receive the generic MSCID from HLR 152 and may map this generic MSCID to an IP address of mapping server 170 responsible for forwarding messages exchanged between H-MPC 160 and S-MPC 140. An MSCID is an address applicable for ANSI-41. ANSI-41 may be employed for communication between serving network 102, home network 104, and RSP network 106, as shown in FIG. 2. It may be desirable for MPCs to communicate with external entities (e.g., LCS clients and other MPCs) using IP. The use of IP may result in lower cost and other benefits for the MPCs. H-MPC 160 may map the generic MSCID applicable for one communication protocol (i.e., ANSI-41) to an IP address applicable for another communication protocol (i.e., IP) based on a static mapping. H-MPC 160 may then exchange messages for location services for roaming mobile station 110 via IP using the IP address mapped to the generic MSCID, as shown in FIGS. 2 and 3.

Second, mapping server 170 may provide mapping functions in order (i) to forward messages from H-MPC 160 to S-MPC 140 on the forward path and (ii) to forward messages from S-MPC 140 to H-MPC 160 on the return path. On the forward path, mapping server 170 may extract the MSID from a message received from H-MPC 160, map the MSID to the IP address of S-MPC 140, and forward the message to S-MPC 140. On the return path, mapping server 170 may ascertain the recipient of a message received from S-MPC 140 based on stored state information and may forward the message to H-MPC 160. The mapping functions provided by mapping server 170 may simplify the operations of H-MPC 160 and S-MPC 140. In particular, H-MPC 160 may use the static mapping of generic MSCID to IP address for mapping server 170, without having to keep track of the serving MSC for mobile station 110 and without having to know which S-MPC is appropriate to serve the mobile station. Similarly, S-MPC 140 may use the IP address of mapping server 170 without having to know which H-MPC is being responded to. Mapping server 170 may efficiently support roaming in different networks. The static mapping of actual MSCIDs to MPC addresses at RSP network 106 may be updated whenever new networks are added to a list of networks supported by RSP network 106 for roaming.

Figure 4:
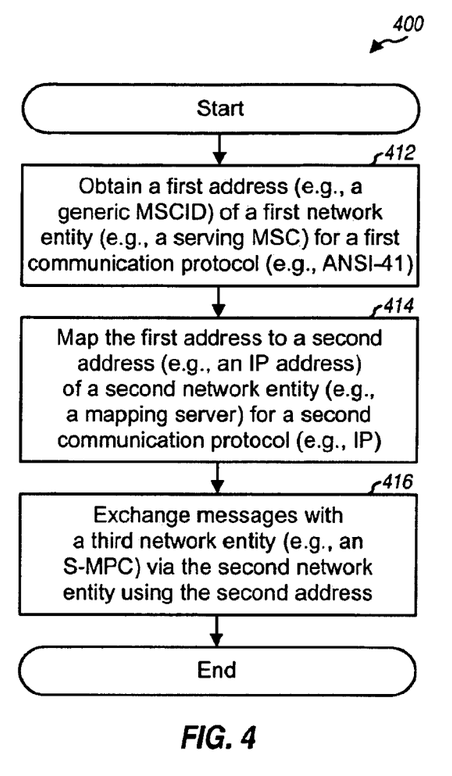
FIG. 4 shows a process performed by an H-MPC to support location services.

FIG. 4 shows a design of a process 400 performed by a network entity such as H-MPC 160 to support location services for a roaming mobile station. A first address of a first network entity for a first communication protocol may be obtained (block 412). The first address may be mapped to a second address of a second network entity for a second communication protocol, e.g., based on a static mapping (block 414). Messages may be exchanged with a third network entity via the second network entity using the second address (block 416).

In one design, the first communication protocol may be ANSI-41, the second communication protocol may be IP, the first address may be an ANSI-41 address, and the second address may be an IP address. In one design, the first network entity may be a serving MSC for the mobile station, the second network entity may be a mapping server, and the third network entity may be an S-MPC. In one design, the first address may be a generic MSCID assigned to the serving MSC by an RSP network instead of an actual MSCID of the serving MSC.

In one design of block 412, a first message comprising an MDN of the mobile station may be sent to an HLR. A second message comprising the generic MSCID of the serving MSC may be received from the HLR. The generic MSCID may be mapped to the MDN of the mobile station at the HLR.

For block 416, messages may be exchanged with the third network entity for location services for the mobile station roaming in a serving network different from a home network. The third network entity may reside in an RSP network different from the serving and home networks. In one design of block 416, a location request message may be sent to the mapping server using the second address. The location request message may comprise the MSID of the mobile station, which may be used by the mapping server to determine an IP address of the S-MPC. A location response message may be received from the mapping server and may comprise a position estimate of the mobile station provided by the S-MPC.

Figure 5:
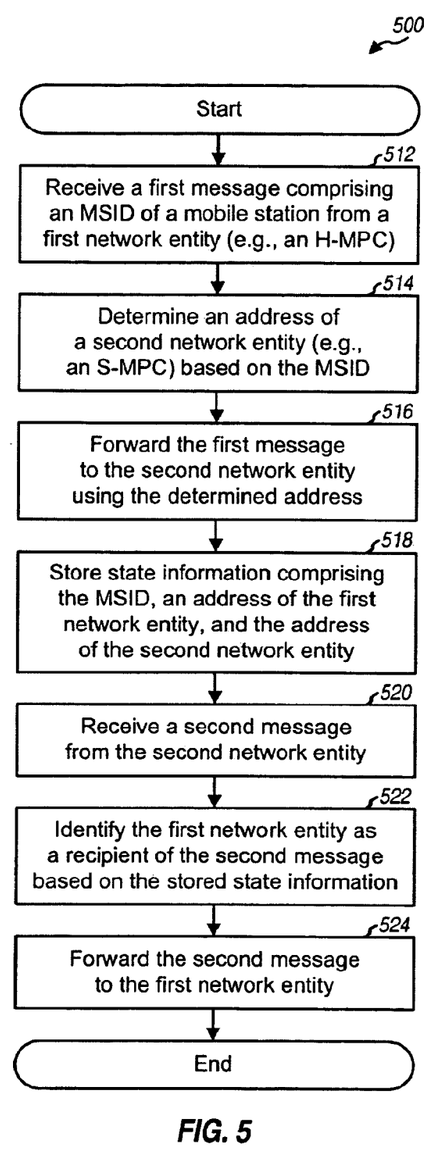
FIG. 5 shows a process performed by a mapping server to support location services.

FIG. 5 shows a design of a process 500 performed by a network entity such as mapping server 170 to support location services for a roaming mobile station. A first message comprising an MSID of the mobile station may be received from a first network entity (block 512). An address of a second network entity may be determined based on the MSID (block 514). The first message may be forwarded to the second network entity using the determined address (block 516).

In one design, the first network entity may be an H-MPC in a home network and the second network entity may be an S-MSC in a serving network for the mobile station. The mapping server may be external to the home and serving networks. The determined address may be an IP address of the S-MPC. In one design of block 514, the MSID of the mobile station may be mapped to an MSCID of a serving MSC for the mobile station. The MSCID may then be mapped to the IP address of the S-MPC.

State information comprising the MSID, an address of the first network entity, and the address of the second network entity may be stored (block 518). Block 518 may be performed prior to block 516. A second message may be received from the second network entity (block 520). The first network entity may be identified as a recipient of the second message based on the stored state information (block 522). The second message may then be forwarded to the first network entity (block 524).

Prior to block 512, an actual MSCID of a serving MSC for the mobile station may be received by the RSP network. The actual MSCID may be mapped to a generic MSCID, which may be provided to the home network. The first message may be sent by the first network entity using an address of the mapping server determined based on the generic MSCID.

Figure 6:
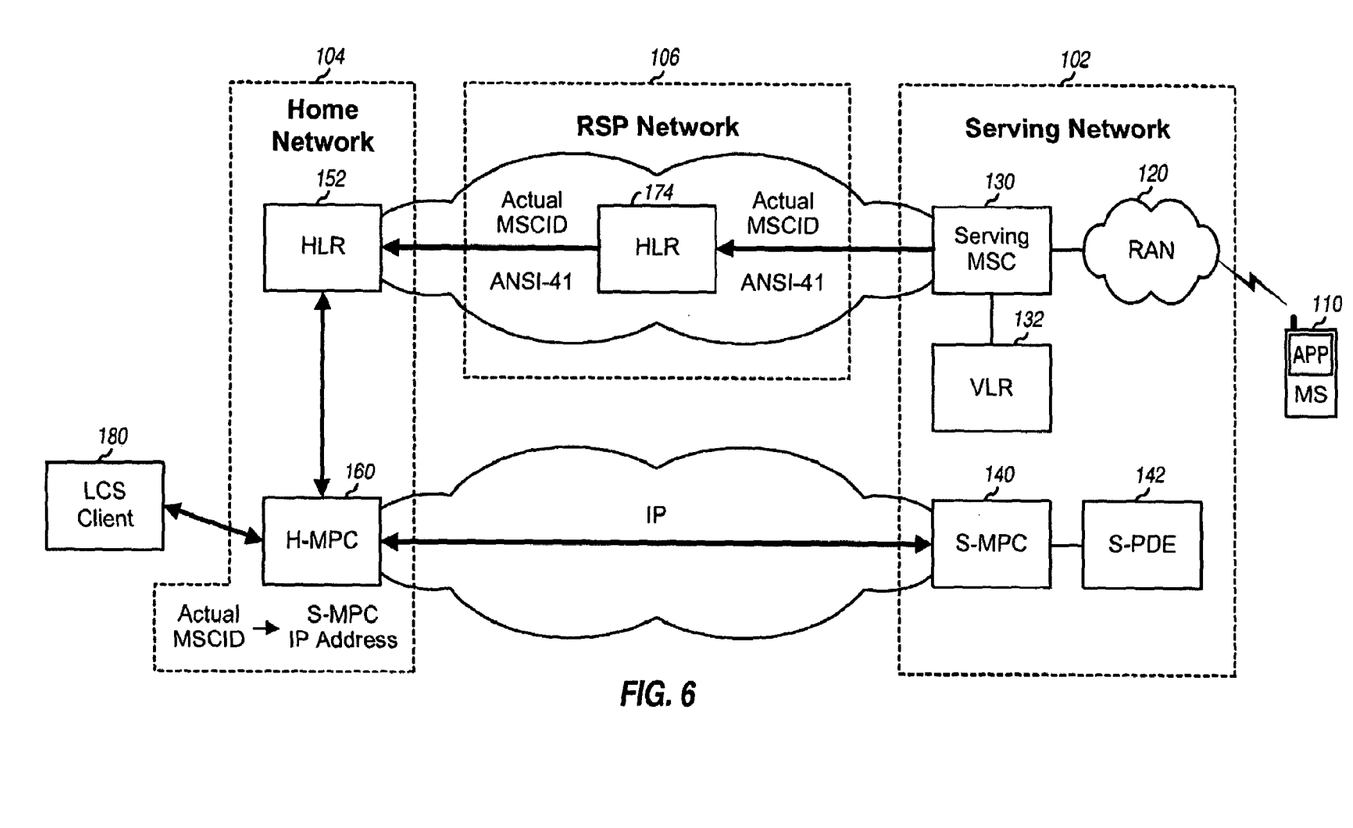
FIG. 6 shows another design to support location services for the roaming mobile station.

FIG. 6 shows another design to support location services for roaming mobile station 110 with a control plane architecture. Mobile station 110 may be roaming and may register with serving network 102. In an aspect, RSP network 106 may provide the actual MSCID of MSC 130 instead of a generic MSCID to home network 104. HLR 152 in home network 104 may store the actual MSCID as information indicative of the current location of mobile station 110. RSP network 106 may keep track of the current serving MSC for mobile station 110 and may send updated MSCID for mobile station 110 to HLR 152, as needed, so that the current serving MSC for the mobile station can be ascertained.

While mobile station 110 is roaming in serving network 102, LCS client 180 may communicate with H-MPC 160 to request the location of mobile station 110. H-MPC 160 may communicate with HLR 152 to obtain the MSCID of the serving MSC for mobile station 110. HLR 152 may return the actual MSCID provided by RSP network 106 for mobile station 110. H-MPC 160 may map the actual MSCID to an IP address of S-MPC 140 designated to serve MSC 130. H-MPC 160 may thereafter exchange messages for location services for mobile station 110 with S-MPC 140 using the S-MPC IP address.

Figure 7:
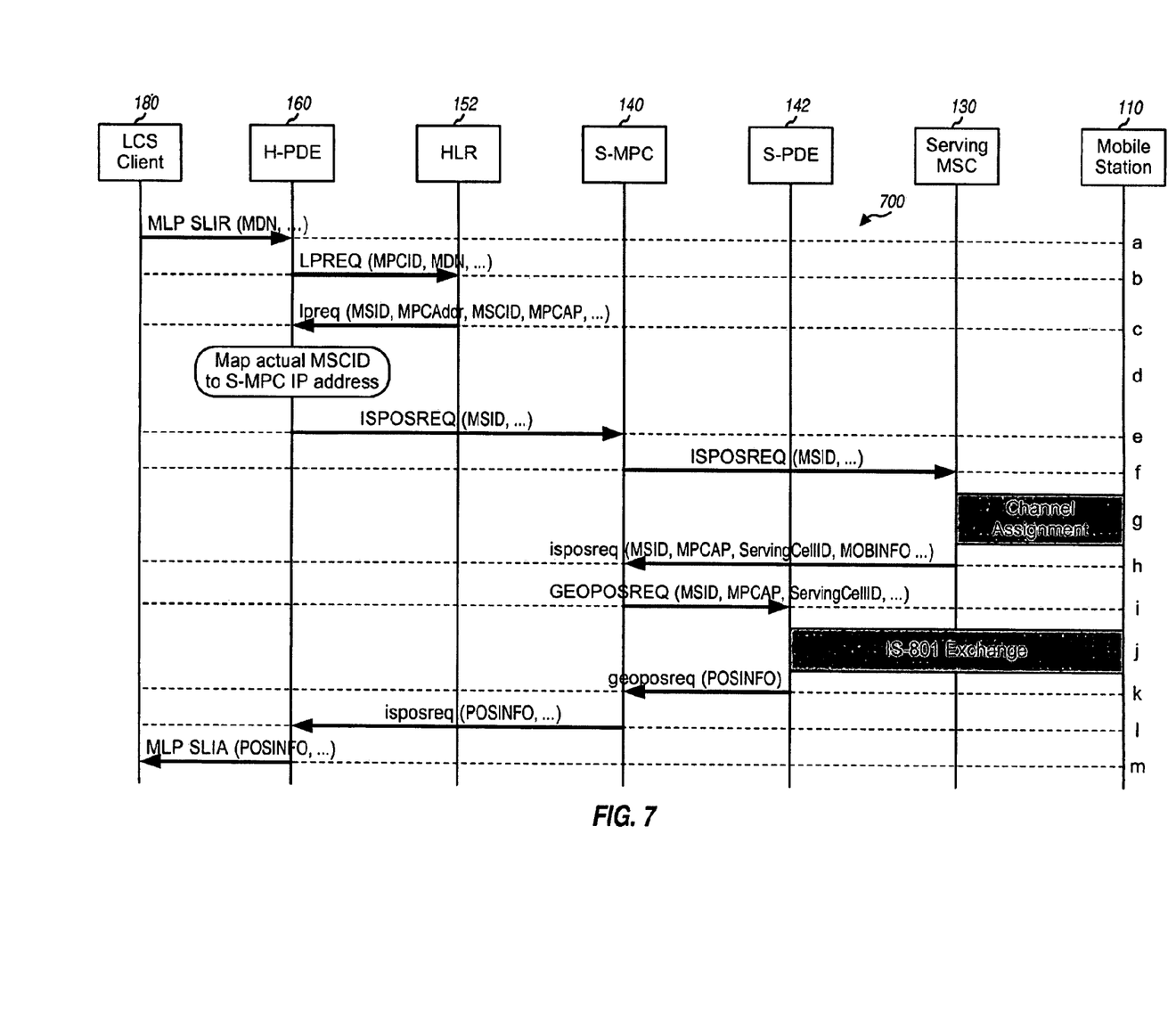
FIG. 7 shows another message flow for network-initiated location services.

FIG. 7 shows a design of a message flow 700 for network-initiated location services for the control plane architecture. LCS client 180 may send an MLP SLIR message to H-MPC 160 to request the location of mobile station 110 (step a). H-MPC 160 may verify that LCS client 180 is authorized to obtain the location of mobile station 110. H-MPC 160 may then send an LPREQ message to HLR 152 to request the MSCID of the serving MSC in which mobile station 110 is registered (step b). HLR 152 may return an lpreq message that may include the actual MSCID of the serving MSC for mobile station 110 (step c). H-MPC 160 may map the actual MSCID to an IP address of S-MPC 140, e.g., based on a static mapping at the H-MPC (step d).

H-MPC 160 may then send an ISPOSREQ message to S-MPC 140 using the S-MPC IP address obtained in step d (step e). The ISPOSREQ message may include the MSID, the actual MSCID, etc. The actual MSCID may be used by S-MPC 140 to invoke IS-881 procedures. S-MPC 140 may receive the ISPOSREQ message from H-MPC 160, verify that this message has been received from an authorized entity, and determine that the current location of mobile station 110 needs to be ascertained. S-MPC 140 may then send an ISPOSREQ message containing the MSID and other information to MSC 130 (step f). MSC 130, RAN 120, and mobile station 110 may exchange signaling to establish paging and/or traffic channel assignment (step g). MSC 130 may then return an isposreq message to S-MPC 140 (step h).

S-MPC 140 may select S-PDE 142 to determine the mobile station location and may send a GPOSREQ message to the S-PDE (step i). S-PDE 142 and mobile station 110 may then engage in an IS-801 session, e.g., for satellite-based positioning (step j). S-PDE 142 may return a position estimate for mobile station 110 in a gposreq message sent to S-MPC 140 (step k). S-MPC 140 may then return an isposreq message with the position estimate to H-MPC 160 (step l). H-MPC 160 may provide the position estimate for mobile station 110 in an MLP SLIA message sent to LCS client 180 (step m).

In the design shown in FIGS. 6 and 7, roaming for location services in the control plan architecture may be supported by having RSP network 106 send the actual MSCID (instead of a generic MSCID) to home network 104. H-MPC 160 may receive the actual MSCID from HLR 152 and may map this MSCID to an IP address of a designated S-MPC 140. The actual MSCID is an ANSI-41 address that may be used to reach the serving MSC. H-MPC 160 may thus map the actual MSCID applicable for one communication protocol (i.e., ANSI-41) to an IP address applicable for another communication protocol (i.e., IP) based on a static mapping. H-MPC 160 may then exchange messages for location services for roaming mobile station 110 via IP using the S-MPC IP address mapped to the actual MSCID, as shown in FIGS. 6 and 7.

Figure 8:
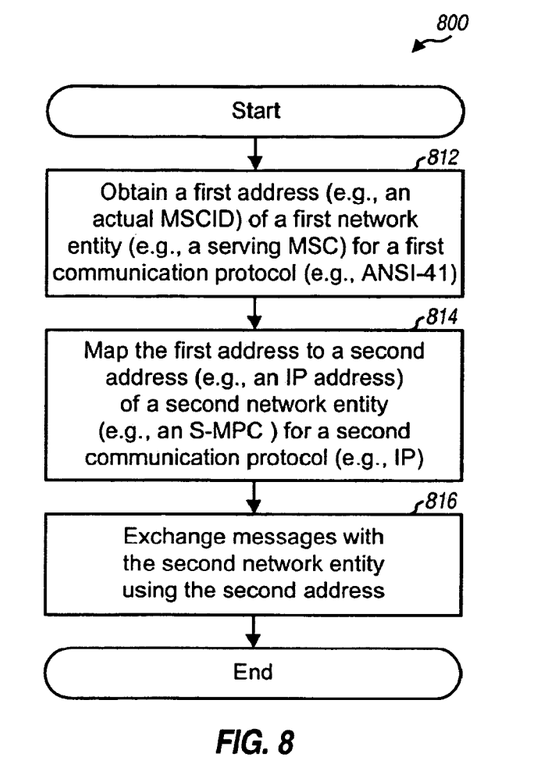
FIG. 8 shows another process performed by the H-MPC to support location services.

FIG. 8 shows a design of a process 800 performed by a network entity such as H-MPC 160 to support location services for a roaming mobile station. A first address of a first network entity for a first communication protocol may be obtained (block 812). The first address may be mapped to a second address of a second network entity for a second communication protocol, e.g., based on a static mapping (block 814). Messages may be exchanged with the second network entity using the second address (block 816)

In one design, the first communication protocol may be ANSI-41, the second communication protocol may be IP, the first address may be an ANSI-41 address, and the second address may be an IP address. In one design, the first network entity may be a serving MSC for the mobile station and the second network entity may be an S-MPC.

In one design of block 812, a first message comprising an MDN of the mobile station may be sent to an HLR. A second message comprising an actual MSCID of the serving MSC for the mobile station may be received from the HLR. The actual MSCID may be the first address provided by an RSP network to a home network and may be mapped to the MDN of the mobile station at the HLR.

In one design of block 816, messages may be exchanged with the second network entity for location services for the mobile station roaming in a serving network different from the home network. A location request message may be sent to the S-MPC using the second address. A location response message comprising a position estimate of the mobile station may thereafter be received from the S-MPC.

Figure 9:
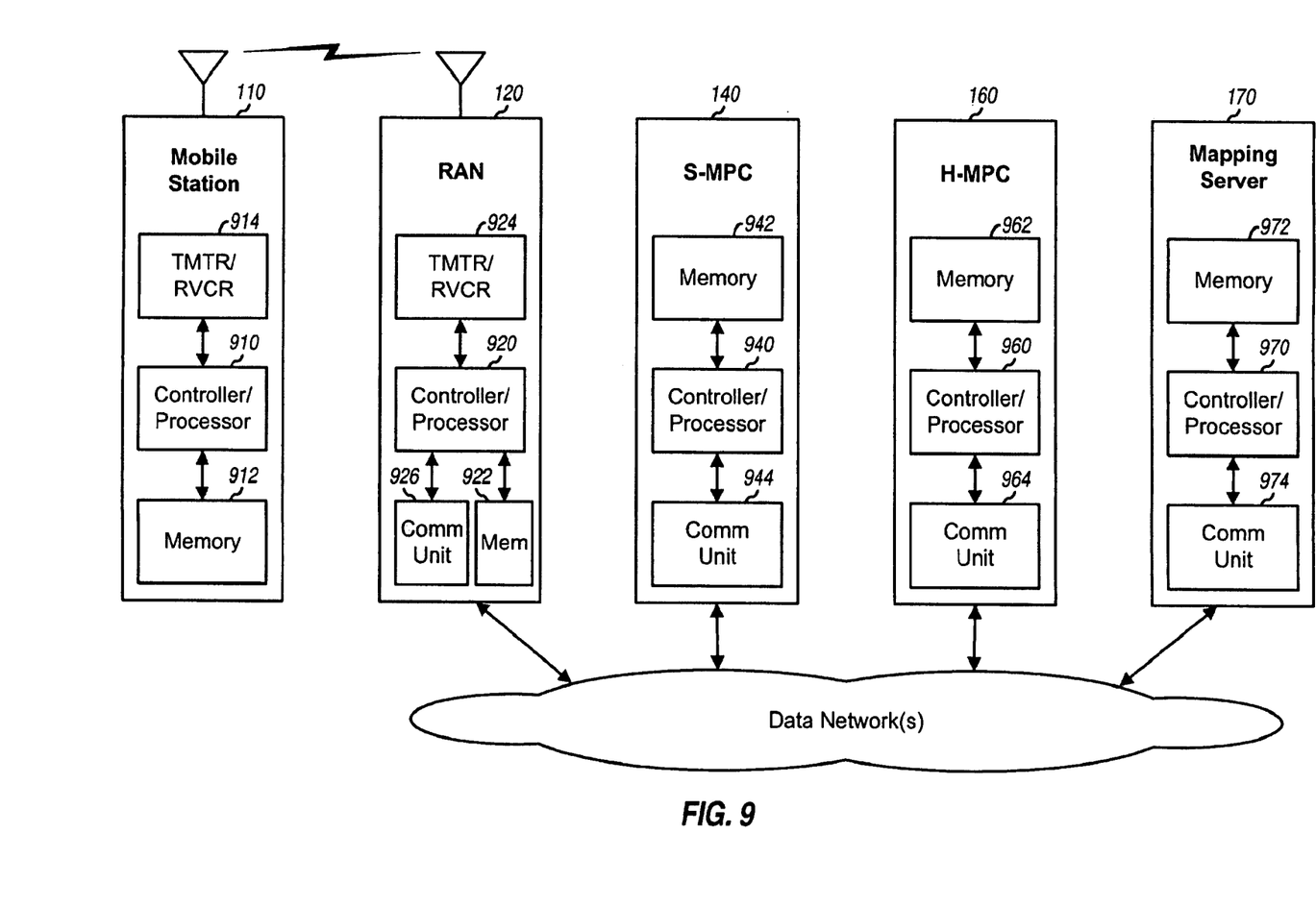
FIG. 9 shows a block diagram of various entities in FIG. 1.

FIG. 9 shows a block diagram of a design of mobile station 110, RAN 120, S-PDE 140, H-PDE 160, and mapping server 170. For simplicity, FIG. 9 shows (i) one controller/processor 910, one memory 912, and one transmitter/receiver (TMTR/RCVR) 914 for mobile station 110, (ii) one controller/processor 920, one memory 922, one transmitter/receiver 924, and one communication (Comm) unit 926 for RAN 120, (iii) one controller/processor 940, one memory 942, and one communication unit 944 for S-PDE 140, (iv) one controller/processor 960, one memory 962, and one communication unit 964 for H-PDE 160, and (v) one controller/processor 970, one memory 972, and one communication unit 974 for mapping server 170. In general, each entity may include any number of controllers, processors, memories, transceivers, communication units, etc.

On the forward link (or downlink), base stations in RAN 120 may transmit traffic data, messages/signaling, and pilot to mobile stations within their coverage areas. These various types of data may be processed by processor 920 and conditioned by transmitter 924 to generate a forward link signal, which may be transmitted to the mobile stations. At mobile station 110, the forward link signals from base stations may be received via an antenna, conditioned by receiver 914, and processed by processor 910 to obtain various types of information for location services and/or other services. For example, processor 910 may decode messages used for the message flows described above. Memories 912 and 922 may store program codes and data for mobile station 110 and RAN 120, respectively.

On the reverse link (or uplink), mobile station 110 may transmit traffic data, messages/signaling, and pilot to base stations in RAN 120. These various types of data may be processed by processor 910 and conditioned by transmitter 914 to generate a reverse link signal, which may be transmitted to the base stations. At RAN 120, the reverse link signals from mobile station 110 and other mobile stations may be received and conditioned by receiver 924 and further processed by processor 920 to obtain various types of information, e.g., data, messages/signaling, etc. RAN 120 may communicate with other network entities via communication unit 926.

Within S-MPC 140, processor 940 may perform processing for location services, memory 942 may store program codes and data for the S-MPC, and communication unit 944 may allow the S-MPC to communicate with other entities. Processor 940 may perform processing for S-MPC 140 in the message flows described above.

Within H-MPC 160, processor 960 may perform processing for location services, memory 962 may store program codes and data for the H-PDE, and communication unit 964 map allow the H-MPC to communicate with other entities. Processor 960 may perform processing for H-MPC 160 in the message flows described above. Processor 960 may also perform or direct process 400 in FIG. 4, process 800 in FIG. 8, and/or other processes for the techniques described herein.

Within mapping server 170, processor 970 may perform processing to map addresses and forward messages, memory 972 may store program codes and data for the mapping server, and communication unit 974 may allow the mapping server to communicate with other entities. Processor 970 may perform processing for mapping server 170 in message flow 300 in FIG. 3. Processor 970 may also perform or direct process 500 in FIG. 5 and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of communication comprising:
obtaining a first address of a first network entity for a first communication protocol;
mapping a second address of a second network entity for a second communication protocol; and
exchanging messages with a third network entity via the second network entity using the second address,
wherein the exchanging messages with the third network entity comprises exchanging messages with the third network entity for location services for a mobile station roaming in a serving network different from a home network, and wherein the second network entity resides in a roaming service provider (RSP) network different from the serving and home networks.

2. A method of communication comprising:
obtaining a first address of a first network entity for a first communication protocol;
mapping a second address of a second network entity for a second communication protocol; and
exchanging messages with a third network entity via the second network entity using the second address,
wherein the first communication protocol comprises ANSI-41, the second communication protocol comprises Internet Protocol (IP), the first address comprises an ANSI-41 address, and the second address comprises an IP address.

3. A method of communication comprising:
obtaining a first address of a first network entity for a first communication protocol;
mapping a second address of a second network entity for a second communication protocol; and
exchanging messages with a third network entity via the second network entity using the second address,
wherein the first network entity is a serving mobile switching center (MSC) for a mobile station, the second network entity is a mapping server, and the third network entity is a serving mobile positioning center (S-MPC), and wherein the obtaining, the mapping, and the exchanging are performed by a home mobile positioning center (H-MPC).

4. The method of claim 3, wherein the obtaining the first address of the first network entity comprises
sending to a home location register (HLR) a first message comprising a Mobile Directory Number (MDN) of the mobile station, and
receiving from the HLR a second message comprising the first address of the serving MSC for the mobile station, the first address being mapped to the MDN of the mobile station.

5. The method of claim 3, wherein the first address comprises a generic MSC identity (MSCID) assigned to the serving MSC by a roaming service provider (RSP) network.

6. The method of claim 3, wherein the exchanging messages with the third network entity comprises
sending a location request message to the mapping server using the second address, the location request message comprising a mobile station identity (MSID) used by the mapping server to determine a third address of the S-MPC, and
receiving a location response message from the mapping server, the location response message comprising a position estimate of the mobile station provided by the S-MPC.

7. An apparatus for communication, comprising at least one processor configured to obtain a first address of a first network entity for a first communication protocol, to map the first address to a second address of a second network entity for a second communication protocol, and to exchange messages with a third network entity via the second network entity using the second address,
wherein the first communication protocol comprises ANSI-41, the second communication protocol comprises Internet Protocol (IP), the first address comprises an ANSI-41 address, the second address comprises an IP address, the first network entity is a serving mobile switching center (MSC) for a mobile station, the second network entity is a mapping server, the third network entity is a serving mobile positioning center (S-MPC), and the apparatus is for a home mobile positioning center (H-MPC).

8. The apparatus of claim 7, wherein the at least one processor is configured to send to a home location register (HLR) a first message comprising a Mobile Directory Number (MDN) of the mobile station, and to receive from the HLR a second message comprising the first address of the serving MSC for the mobile station, the first address comprising a generic MSC identity (MSCID) assigned to the serving MSC by a roaming service provider (RSP) network and mapped to the MDN of the mobile station.

9. A method of communication comprising:
obtaining a first address of a first network entity for a first communication protocol;
mapping the first address to a second address of a second network entity for a second communication protocol; and
exchanging messages with the second network entity using the second address,
wherein the exchanging messages with the second network entity comprises exchanging messages with the second network entity for location services for a mobile station roaming in a serving network different from a home network, and wherein the first address is provided by a roaming service provider (RSP) network to the home network.

10. A method of communication comprising:
obtaining a first address of a first network entity for a first communication protocol;
mapping the first address to a second address of a second network entity for a second communication protocol; and
exchanging messages with the second network entity using the second address,
wherein the first communication protocol comprises ANSI-41, the second communication protocol comprises Internet Protocol (IP), the first address comprises an ANSI-41 address, and the second address comprises an IP address.

11. A method of communication comprising:
obtaining a first address of a first network entity for a first communication protocol;
mapping the first address to a second address of a second network entity for a second communication protocol; and
exchanging messages with the second network entity using the second address,
wherein the first network entity is a serving mobile switching center (MSC) for a mobile station and the second network entity is a serving mobile positioning center (S-MPC), and wherein the obtaining, the mapping, and the exchanging are performed by a home mobile positioning center (H-MPC).

12. The method of claim 11, wherein the obtaining the first address of the first network entity comprises
sending to a home location register (HLR) a first message comprising a Mobile Directory Number (MDN) of the mobile station, and
receiving from the HLR a second message comprising an MSC identity (MSCID) of the serving MSC for the mobile station, the MSCID being the first address and mapped to the MDN of the mobile station.

13. The method of claim 11, wherein the exchanging messages with the second network entity comprises
sending a location request message to the S-MPC using the second address, and
receiving from the S-MPC a location response message comprising a position estimate of the mobile station.

14. An apparatus for communication comprising at least one processor configured to obtain a first address of a first network entity for a first communication protocol, to map the first address to a second address of a second network entity for a second communication protocol, and to exchange messages with the second network entity using the second address,
wherein the first communication protocol comprises ANSI-41, the second communication protocol comprises Internet Protocol (IP), the first address comprises an ANSI-41 address, the second address comprises an IP address, the first network entity is a serving mobile switching center (MSC) for a mobile station, the second network entity is a serving mobile positioning center (S-MPC), and the apparatus is for a home mobile positioning center (H-MPC).

15. The apparatus of claim 14, wherein the at least one processor is configured to send to a home location register (HLR) a first message comprising a Mobile Directory Number (MDN) of the mobile station, and to receive from the HLR a second message comprising an MSC identity (MSCID) of the serving MSC for the mobile station, the MSCID being the first address and mapped to the MDN of the mobile station.

16. An apparatus for communication comprising at least one processor configured to obtain a first address of a first network entity for a first communication protocol, to map the first address to a second address of a second network entity for a second communication protocol, and to exchange messages with the second network entity using the second address,
wherein the at least one processor is configured to send a location request message to the S-MPC using the second address, and to receive from the S-MPC a location response message comprising a position estimate of the mobile station.

* * * * *